No. 789,541. PATENTED MAY 9, 1905.
A. HAYES.
PIPE COUPLING.
APPLICATION FILED JULY 14, 1904.
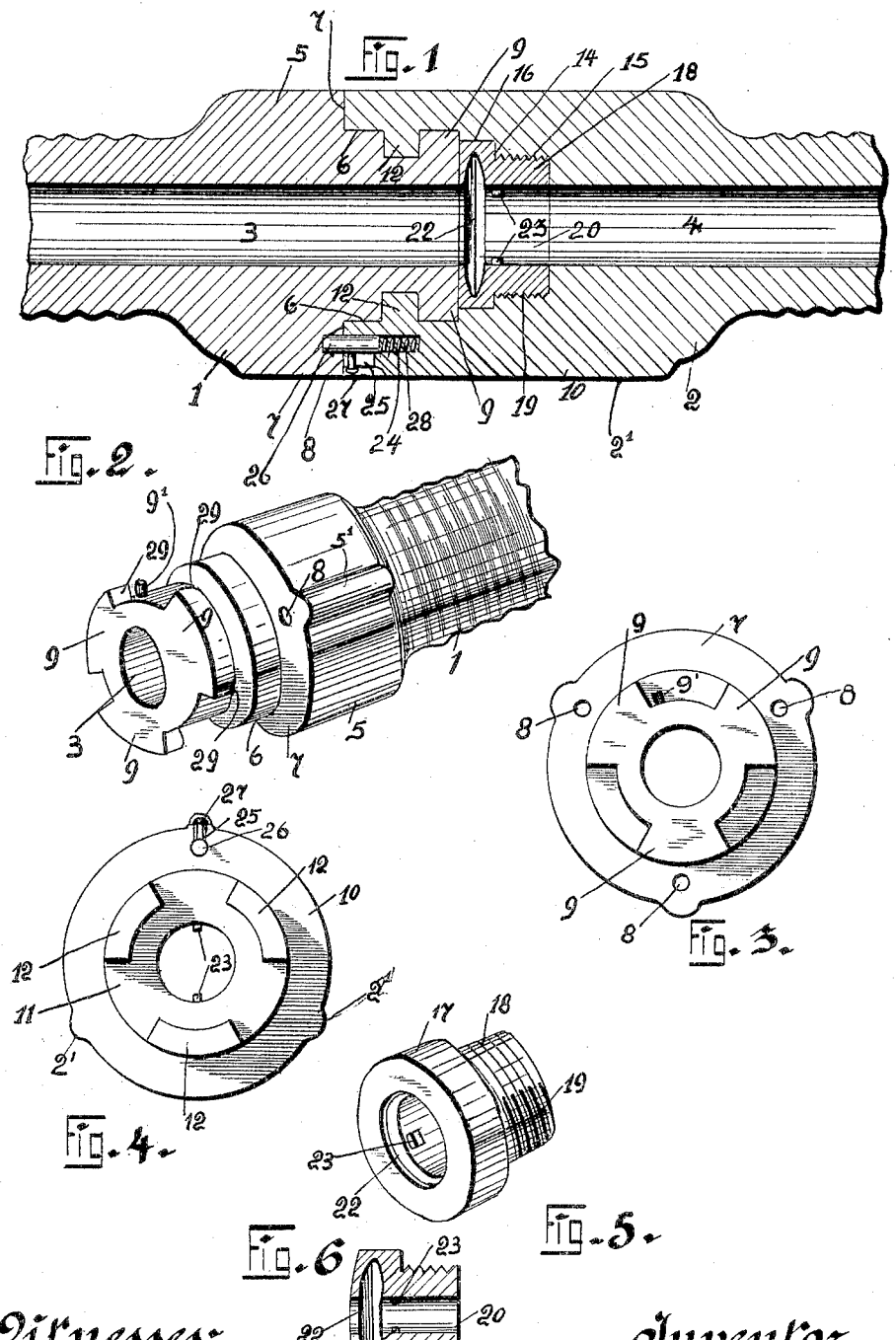
Witnesses:
C. Klostermann
J. H. Butler
Inventor
Alexander Hayes.
by N. C. Evert & Co.
Attorneys.

No. 789,541. Patented May 9, 1905.

UNITED STATES PATENT OFFICE.

ALEXANDER HAYES, OF EMPIRE, OHIO.

PIPE-COUPLING.

SPECIFICATION forming part of Letters Patent No. 789,541, dated May 9, 1905.

Application filed July 14, 1904. Serial No. 216,477.

*To all whom it may concern:*

Be it known that I, ALEXANDER HAYES, a citizen of the United States of America, residing at Empire, in the county of Jefferson and State of Ohio, have invented certain new and useful Improvements in Pipe-Couplings, of which the following is a specification, reference being had therein to the accompanying drawings.

This invention has relation to pipe-couplings, and has for its object to provide a coupling which may be used upon steam, air, or water pipes, and it is particularly adapted for connecting two sections of hose together, whereby the coupling may be accomplished in a quick and easy manner, providing a connection which will be steam, water, and air tight, the construction of the same being such as to overcome the leakable features which have been experienced in couplings heretofore used.

Another object of my invention is to construct a coupling which will be comparatively inexpensive to manufacture, strong and durable, and highly efficient in operation, and in connection with the coupling I employ novel means to render the same non-leakable, also novel means to lock the two pipe-sections together in such a manner that they may be released quickly when it is so desired.

Briefly described, my improved coupling comprises two members, one of which is adapted to fit within the other, and interposed between the two members is mounted a particular form of washer which I employ for rendering the same non-leakable when used either as a steam, water, or air coupling. One of the members is provided with a plurality of lugs which are adapted to interlock behind a plurality of shoulders carried by the other member, and when said members are in engagement with each other a spring-pressed pin carried by one of said members is adapted to engage in a recess formed in the other member.

The above construction and many advantages derived from the same will be hereinafter described and set forth.

Referring to the drawings accompanying this application, wherein like numerals of reference indicate like parts throughout the several views, Figure 1 is a longitudinal sectional view of my improved coupling. Fig. 2 is a detail perspective view of one of the members comprising the coupling. Fig. 3 is an end view of the same. Fig. 4 is an end view of the other member of my improved coupling. Fig. 5 is a perspective view of an improved form of washer forming one of the parts of my invention, and Fig. 6 is a longitudinal sectional view of the same.

To put my invention into practice, I employ two members 1 and 2, each of which is provided with a central bore 3 and 4, the bore of each member being adapted to lie in longitudinal alinement with each other when the two members are joined together. I will first describe the construction of the member 1, which is illustrated in Fig. 2 of the drawings. This member is formed with two collars 5 and 6, the collar 6 being smaller than the collar 5 and is formed integral with the same, providing an annular shoulder 7, in which a plurality of recesses 8 8 are formed, the object of which will be hereinafter more fully set forth. Upon the end of the member 1 is formed a plurality of lugs 9, and in the accompanying drawings I have illustrated three of these lugs as being employed, said lugs being equally spaced apart and having their outer edges conformable to segments of a circle. The reference-numeral 5' indicates a rib which is formed upon the collar 5 opposite each one of the recesses 8. This rib serves to strengthen the recesses, also to form gripping means whereby the two members comprising the coupling may be readily secured together. The reference-numeral 9' indicates a stop or lug which is formed upon the member 1, and this stop is employed to engage one of the shoulders or lugs 12, which will be hereinafter more fully described.

The member 2, as illustrated in Figs. 1 and 4 of the drawings, also is formed with an enlarged collar 10, and the end of the member is cut away, forming an annular recess 11, said recess being so machined as to form inwardly-projecting lugs 12, these lugs corresponding in number to the lugs 9 and are of the same shape. This end of the member 2 is again cut away to form a recess 14, which is screw-threaded, as indicated at 15, a shoulder 16 being formed, which is adapted to receive an annular collar 17, carried by a washer, this washer having a contracted portion 18, which is screw-threaded, as indicated at 19. The washer, as illustrated in Figs. 5 and 6 of the drawings, is provided with a bore 20 of the same diameter as the bores 3 and 4 of the members comprising the coupling, and the face of the collar 17 is beveled, as indicated at 21, and the bore 20 of the washer near the beveled end thereof is machined to form an annular groove 22, and when the bore is drilled lugs 23 23 are formed therein, whereby a suitable tool or instrument, such as a wrench, may be inserted within the recess 22 and by rotating the same cause the threads 19 of the washer to engage the threads 15 of the recess. The member 2 is also provided with ribs 2', which when the two members are secured together will lie in alinement with the ribs 5' of the member 1.

In one of the ribs 2' of the collar 10 of the member 2 is drilled a recess 24, this recess being placed near the periphery of the collar, and equidistant between two of the lugs 12 12 and communicating with said recess is a slot 25. In the recess is mounted a pin 26, which carries a headed pin 27, and between the base of the recess and the pin 26 is mounted a spiral spring 28, which has a tendency to force the pin 26 outwardly. The pin 27 may be secured to the pin 26 by any desired means, either screw-threaded into the same or welded thereon.

When the two members 1 and 2 are to be secured together, the member 1 is placed within the member 2 and the lugs 9 of the member 1 passed through the space formed between the lugs 12 12 of the member 2, and when the member 1 has been placed in the member 2 it is rotated to place the lugs 9 9 behind the lugs 12 12, as illustrated in Fig. 1 of the drawings, the end of the member 2 abutting against the shoulder 7 of the member 1, and when so placed in this position the pin 26 is adapted to engage in either one of the recesses 8 8, which are formed in the shoulder 7 in longitudinal alinement with the lugs 9 9. The operation of locking the lugs 9 9 behind the lugs 12 is facilitated by providing the rear face of the lugs 9 9 with beveled edges 29 29, and when the lugs 9 9 are secured behind the lugs 12 12 and locked in this position the end of the member 1 is adapted to engage the beveled end 21 of the washer and force the end of the same inwardly to the position shown in Fig. 1 of the drawings. This inward movement of the end of the washer is permitted by forming the annular groove 22 within the bore 20 near the beveled end, and as this washer is preferably made of brass and the groove being formed near the beveled end of the washer the beveled end will be resilient to a certain extent to form a tight joint between the members 1 and 2 where the bore 3 joins the bore 4 of each member. The resiliency of the beveled end 21 of the washer will be comparatively small, but sufficient to make a tight connection between the two members, this form of washer dispensing with the ordinary and well-known rubber or leather gasket commonly used, and by employing a washer made of brass or the like I have provided means whereby the life of the coupling will be considerably lengthened over couplings with rubber or leather washers. These washers being subjected to steam, water, or air are rendered useless in a short time.

It will be observed by the form of construction I employ that when the one member is inserted within the other in order to lock the same it will be necessary to rotate it in one direction, this being occasioned by the stop 9'. This stop, as heretofore stated, is adapted to engage one of the inwardly-projecting shoulders or lugs 12 and limit the movement of the member 1 within the member 2, whereby if the member 1 is rotated until it cannot be rotated any further the locking of the two members together will be assured by the pin 26 engaging within one of the recesses 8.

In Figs. 1 and 2 of the drawings the ends opposite the adjoining ends of the members 1 and 2 are corrugated or grooved to receive two sections of pipe or hose that may be connected to the same, and I wish it to be understood that the coupling may be readily constructed in connection with steam, water, or air pipes and will not be limited to hose-couplings.

While I have herein shown three lugs which are adapted to interlock behind three other lugs, it is obvious that any number of these interlocking lugs may be employed and that various other slight changes may be made in the construction of my improved coupling without departing from the scope of the invention.

What I claim is—

1. In a coupling of the character described, the combination with two pipe-sections, one of said sections adapted to interlock in the other section, of a metallic washer interposed between said sections, said washer having a resilient beveled end, said washer having an annular groove formed in its bore adjacent to said beveled end, and means for locking said sections together.

2. A washer for pipe-couplings consisting of a section of metal having a resilient beveled end, a central bore, and an annular groove formed within the bore adjacent to the beveled end.

3. In a pipe-coupling the combination of two members, one being adapted to fit into and be engaged by the other, with a metallic washer exteriorly screw-threaded and screwing into one of said sections and having a central bore, a resilient end, and an annular groove formed in the bore adjacent to said end.

4. In a coupling of the character described, the combination with two sections of pipe, one of said sections, adapted to interlock in the other section, of a metallic washer interposed between said sections, said washer having an annular groove formed therein and a resilient end, substantially as described.

In testimony whereof I affix my signature in the presence of two witnesses.

ALEXANDER HAYES.

Witnesses:
  E. E. POTTER,
  K. H. BUTLER.